United States Patent
Iden et al.

(10) Patent No.: US 9,799,903 B2
(45) Date of Patent: Oct. 24, 2017

(54) ELECTROCATALYST FOR SOLID POLYMER FUEL CELL

(75) Inventors: Hiroshi Iden, Yokosuka (JP); Atsushi Ohma, Yokohama (JP); Kei Sakai, Yokohama (JP); Kazuyuki Satou, Yokohama (JP); Yoshitaka Ono, Yokohama (JP); Hiroyuki Tanaka, Yokohama (JP); Ken Akizuki, Nishitokyo (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 963 days.

(21) Appl. No.: 13/880,393

(22) PCT Filed: Oct. 21, 2011

(86) PCT No.: PCT/JP2011/074300
§ 371 (c)(1),
(2), (4) Date: Jun. 13, 2013

(87) PCT Pub. No.: WO2012/053638
PCT Pub. Date: Apr. 26, 2012

(65) Prior Publication Data
US 2014/0199609 A1 Jul. 17, 2014

(30) Foreign Application Priority Data

Oct. 22, 2010 (JP) .................................. 2010-237263
Sep. 16, 2011 (WO) ................... PCT/JP2011/071228

(51) Int. Cl.
*H01M 4/90* (2006.01)
*H01M 8/1004* (2016.01)
(Continued)

(52) U.S. Cl.
CPC ....... *H01M 8/1004* (2013.01); *H01M 4/9041* (2013.01); *H01M 4/9058* (2013.01);
(Continued)

(58) Field of Classification Search
CPC ............. H01M 4/8663; H01M 4/8626; H01M 4/8647; H01M 4/8673; H01M 8/0245;
(Continued)

(56) References Cited

U.S. PATENT DOCUMENTS 3,964,933 A * 6/1976 Fung ....................... H01M 4/96
429/231.8
6,548,202 B2 * 4/2003 Campbell ........... H01M 4/8605
429/484
(Continued)

FOREIGN PATENT DOCUMENTS

EP 1494304 A1 1/2005
EP 2045859 A1 4/2009
(Continued)

OTHER PUBLICATIONS

The extended European search report dated Dec. 2, 2014, from the corresponding European Application No. 11834477.9.

*Primary Examiner* — Lisa S Park
(74) *Attorney, Agent, or Firm* — Young Basile Hanlon & MacFarlane, P.C.

(57) ABSTRACT

Provided is an electrocatalyst for solid polymer fuel cells capable of increasing the active surface area for reactions in a catalyst component, increasing the utilization efficiency of the catalyst, and reducing the amount of expensive precious metal catalyst used. Also provided are a membrane electrode assembly that uses this electrocatalyst and a solid polymer fuel cell. An electrocatalyst for a solid polymer fuel cell is provided with a catalyst and solid proton conducting material. A liquid conductive material retention part that retains a liquid proton conducting material that connects the catalyst and solid proton conducting material is provided between the same. The surface area of the catalyst exposed within the liquid conductive material retention part is larger than the (Continued)

surface area of the catalyst in contact with the solid proton conducting material.

9 Claims, 2 Drawing Sheets

(51) Int. Cl.
*H01M 4/92* (2006.01)
*H01M 8/1007* (2016.01)
(52) U.S. Cl.
CPC ............ *H01M 4/9083* (2013.01); *H01M 4/92* (2013.01); *H01M 4/926* (2013.01); *H01M 8/1007* (2016.02)
(58) Field of Classification Search
CPC ............ H01M 8/0241; H01M 8/1004; H01M 8/1007; H01M 4/9041; H01M 4/9058; H01M 4/9083; H01M 4/926; H01M 4/92
See application file for complete search history.

(56) References Cited

U.S. PATENT DOCUMENTS

| 2003/0232714 | A1* | 12/2003 | Yan | H01M 4/881 502/101 |
| 2004/0096729 | A1* | 5/2004 | Tanaka | H01M 4/8652 429/482 |
| 2004/0247986 | A1* | 12/2004 | Takeguchi | H01M 8/0258 429/457 |
| 2005/0186467 | A1* | 8/2005 | Sugiura | H01M 4/8605 429/492 |
| 2008/0063922 | A1* | 3/2008 | Jang | H01B 1/04 429/483 |
| 2008/0280752 | A1* | 11/2008 | Okumura | H01M 4/8605 502/100 |
| 2009/0325022 | A1* | 12/2009 | Hama | H01M 4/8807 429/481 |
| 2010/0015490 | A1* | 1/2010 | Yamada | H01M 8/04119 429/414 |
| 2010/0227249 | A1* | 9/2010 | Kawamura | H01M 4/8605 429/483 |
| 2011/0189589 | A1* | 8/2011 | Erlebacher | B01J 21/02 429/523 |
| 2012/0100461 | A1* | 4/2012 | Iden | H01M 4/8605 429/516 |
| 2013/0071771 | A1* | 3/2013 | Vincent | H01M 4/8605 429/487 |

FOREIGN PATENT DOCUMENTS

| JP | 2001-167770 A | 6/2001 |
| JP | 2005-034836 A | 2/2005 |
| JP | 2007-203216 A | 8/2007 |
| JP | 2007207678 A | 8/2007 |
| JP | 2007-250274 A | 9/2007 |
| JP | 2007-335338 A | 12/2007 |
| JP | 2007329072 A | 12/2007 |
| JP | 2010-282804 A | 12/2010 |
| WO | 2008093731 A1 | 8/2008 |
| WO | 2009116157 A1 | 9/2009 |

* cited by examiner

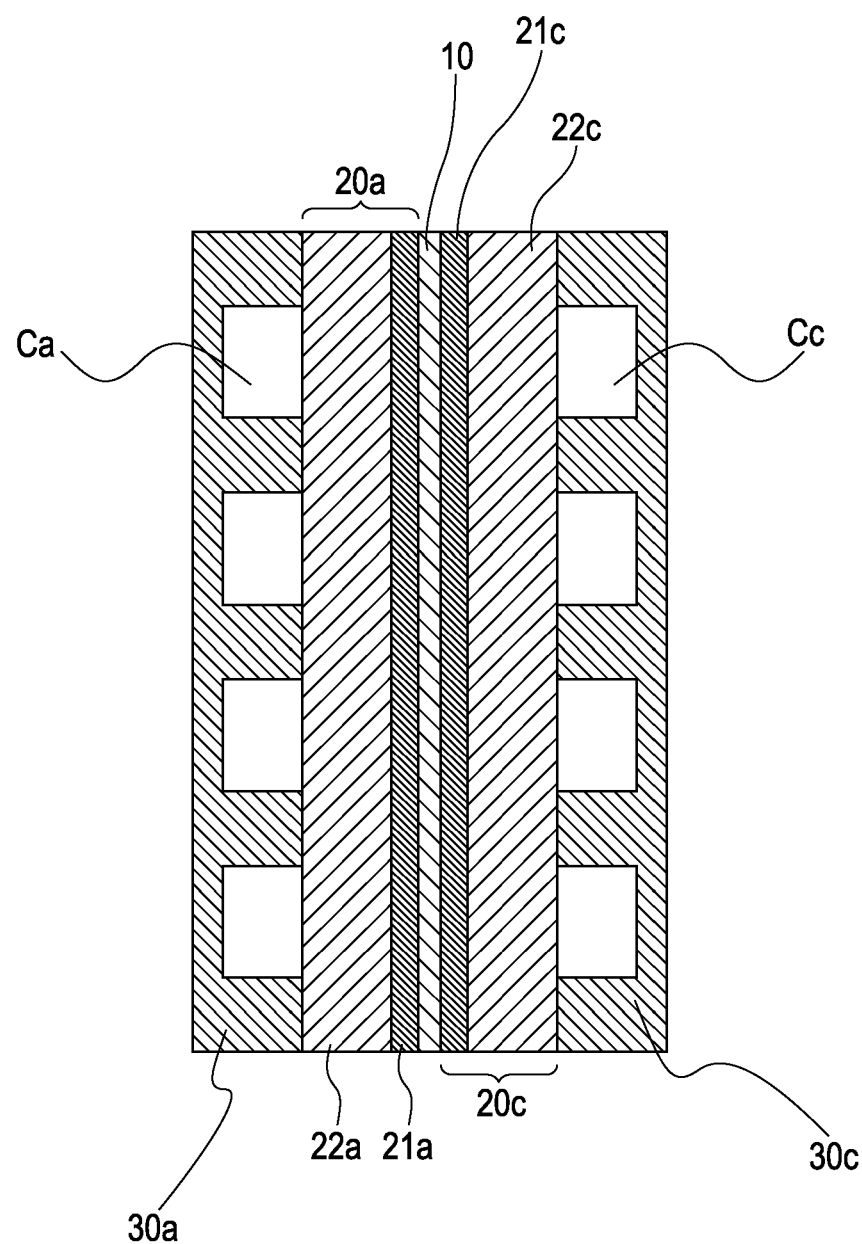

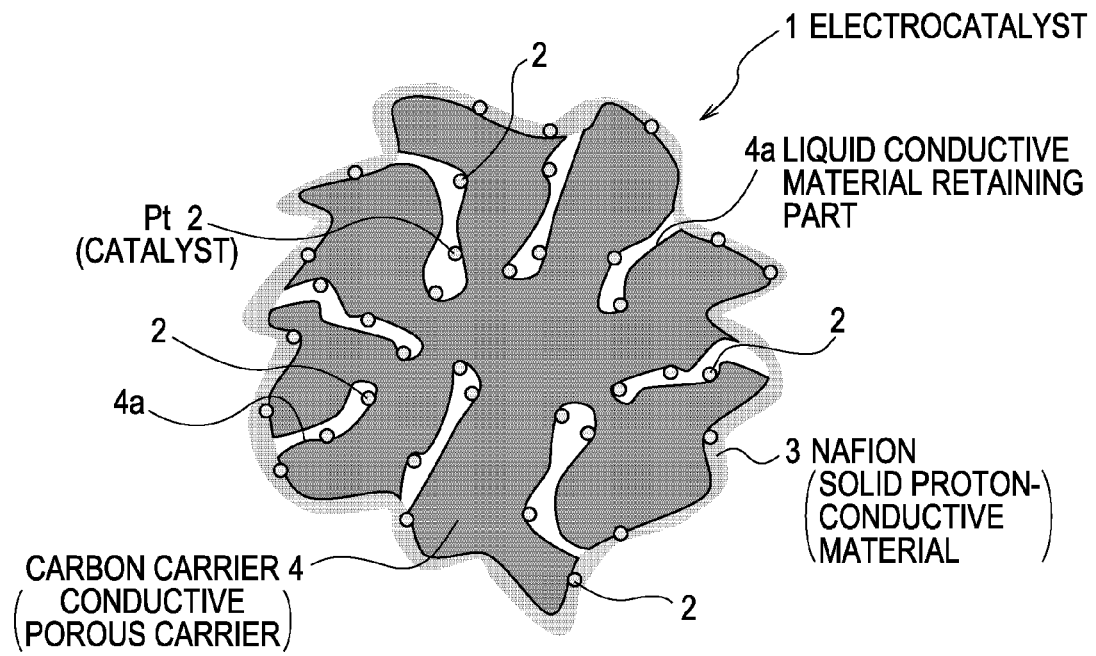
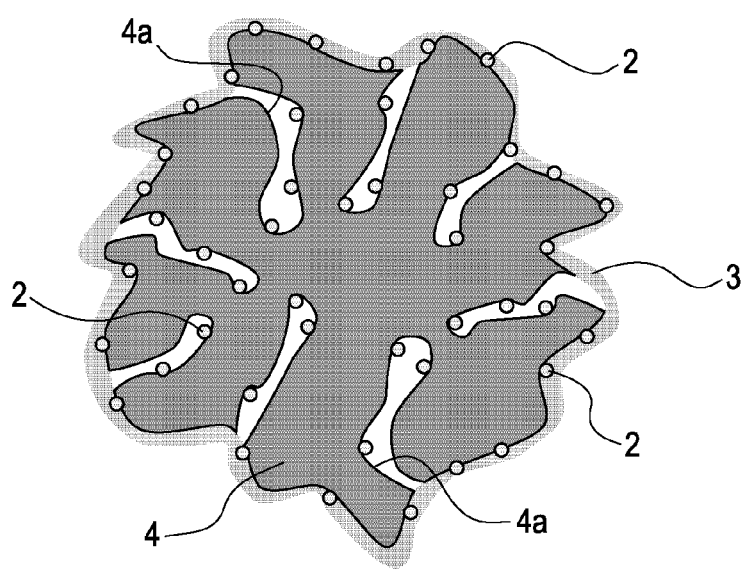

ELECTROCATALYST FOR SOLID POLYMER FUEL CELL

TECHNICAL FIELD

The present invention relates to an electrocatalyst for use in polymer electrolyte fuel cells (PEFCs), and a membrane electrode assembly and a polymer electrolyte fuel cell that use the electrocatalyst.

BACKGROUND

Polymer electrolyte fuel cells that use proton-conductive solid polymer membranes operate at low temperatures compared to other types of fuel cells such as solid oxide fuel cells and molten carbonate fuel cells and are considered as a prospective candidate for stationary power sources and mobile power sources for automobiles and the like. Practical application thereof has already started.

Expensive metal catalysts such as platinum (Pt) and platinum alloys are used in polymer electrolyte fuel cells and this has raised the price of these fuel cells. Accordingly, development of a technology that decreases the amounts of these noble metal catalysts used and reduces the cost of these fuel cells has been desired.

For example, Japanese Unexamined Patent Application Publication No. 2007-250274 discloses an electrocatalyst for the above-described fuel cells, in which the average particle size of a catalytic metal is increased to be larger than the average pore size of fine pores of a conductive carrier so that the catalytic particles do not penetrate the fine pores. As a result, the amount of unused catalytic metal that does not contact the electrolyte polymer is decreased and the efficiency of utilizing expensive catalytic metals is enhanced.

However, according to the approach of enhancing the efficiency by increasing the size of the catalytic metal particles, the specific surface area will be decreased as the percentage of the catalytic metal particles contacting the electrolyte polymers is increased. In other words, the power generating performance per catalytic metal weight is degraded and the amount of expensive metal catalysts needs to be increased in order to maintain the same power generating performance as before this approach is taken.

BRIEF SUMMARY

The present invention has been made to address the above-described problem of polymer electrolyte fuel cells. An object of the invention is to provide an electrocatalyst for a polymer electrolyte fuel cell with which the active area of the catalyst is increased, the efficiency of utilizing the catalyst is enhanced, and the amount of the expensive noble metal catalyst used can be decreased. Also provided are a membrane electrode assembly and a polymer membrane fuel cell that use such an electrocatalyst.

The inventors of the present invention have conducted various studies to achieve the object described above. The inventors noticed that when a solid proton-conductive material (electrolyte polymer), which readily adsorb to a catalyst surface compared to reactive substances such as oxygen, makes contact with a catalyst surface, the active area of the catalyst surface is decreased.

The inventors have then found that the object can be achieved by minimizing the direct contact between a solid proton-conductive material and a catalyst and interposing a liquid proton-conductive material, such as water, between the solid proton-conductive material and the catalyst. Thus, the present invention has been made.

The present invention has been made based on the above-described findings. An electrocatalyst for a polymer electrolyte fuel cell includes a catalyst, a solid proton-conductive material, and a liquid conductive material retaining part that retains a liquid proton-conductive material that connects the catalyst to the solid proton-conductive material in a proton-conductive manner, the liquid conductive material retaining part being disposed between the catalyst and the solid proton-conductive material. The contact area between the catalyst and the solid proton-conductive material is smaller than the area of the catalyst exposed in the liquid conductive material retaining part According to the present invention, the direct contact between a solid proton-conductive material and a catalyst is suppressed and proton transport paths are formed via a liquid proton-conductive material in a liquid conductive material retaining part. Thus, the active area of the catalyst is maintained, the efficiency of utilizing the catalyst is improved, and the amount of catalysts can be reduced while keeping the power generating performance.

BRIEF DESCRIPTION OF THE DRAWINGS

The description herein makes reference to the accompanying drawings wherein like reference numerals refer to like parts throughout the several views, and wherein:

FIG. 1 is a schematic cross-sectional view showing a structural example of a polymer electrolyte fuel cell of the present invention.

FIG. 2 is a schematic cross-sectional view showing the shape and structure of an electrocatalyst for a polymer electrolyte fuel cell according to the present invention obtained in Example.

FIG. 3 is a schematic cross-sectional view showing the shape and structure of an electrocatalyst for a polymer electrolyte fuel cell according to Comparative Example in contrast to Example described above.

DETAILED DESCRIPTION

An electrocatalyst for a polymer electrolyte fuel cell, a membrane electrode assembly that uses the electrocatalyst, and a fuel cell that uses the electrocatalyst according to the present invention will now be described in specific detail. In this description, "%" means percent by mass unless otherwise noted.

An electrocatalyst for a polymer electrolyte fuel cell according to the present invention includes a catalyst, a solid proton-conductive material, and a liquid conductive material retaining part that retains a liquid proton-conductive material that connects the catalyst to the solid proton-conductive material in a proton-conductive manner. The contact area between the catalyst and the solid proton-conductive material is smaller than the area of the catalyst exposed in the liquid conductive material retaining part. More preferably, the catalyst and the solid proton-conductive material are not in contact with each other.

That is, in order to maintain the active area of the catalyst such as platinum while transporting protons needed for power generation to the catalyst surface, sufficient proton transport paths must be maintained while avoiding direct contact between the catalyst and the solid proton-conductive material that has strong adsorption power to the catalyst surface and a tendency to coat the surface of the catalyst.

In the present invention, a liquid conductive material retaining part is interposed between the catalyst and the solid proton-conductive material. A liquid proton-conductive material is fed to this retaining part and thus proton transport paths are formed between the catalyst and the solid proton-conductive material via the liquid proton-conductive material.

The catalyst used in the electrocatalyst for a polymer electrolyte fuel cell of the present invention is not particularly limited. For example, one or a desired combination of two or more of various known metals such as platinum (Pt), iridium (Ir), cobalt (Co), nickel (Ni), iron (Fe), copper (Cu), ruthenium (Ru), silver (Ag), and palladium (Pd) can be used.

The shape and size of the catalytic metal are not particularly limited. The catalytic metal may have the same shape and size as known catalytic metals. The shape may be granular, flaky, or layered. Typically, when a catalytic metal having a granular shape is used, the size is preferably about 1 to 30 nm and more preferably within the range of 2 to 5 nm.

The solid proton-conductive material used in the electrocatalyst of the present invention is not particularly limited and any known material may be used.

The solid proton-conductive material used in the present invention is roughly either a fluorine-based electrolyte that contains fluorine atoms in all or some parts of the polymer skeleton or a hydrocarbon-based electrolyte that does not contain fluorine atoms in the polymer skeleton.

Examples of preferred fluorine-based electrolytes include perfluorocarbon sulfonic acid-based polymers, polytrifluorostyrene sulfonic acid-based polymers, perfluorocarbon phosphonic acid-based polymers, trifluorostyrene sulfonic acid polymers, ethylene tetrafluoroethylene-g-styrenesulfonic acid-based polymers, ethylene-tetrafluoroethylene copolymers, and polyvinylidene fluoride-perfluorocarbon sulfonic acid-based polymers such as Nafion (registered trademark, produced by DuPont), Aciplex (registered trademark, produced by Asahi Kasei Chemicals Corporation), and Flemion (registered trademark, produced by Asahi Glass Co., Ltd.). These fluorine-based electrolytes typically have high durability and good mechanical strength.

Examples of preferred hydrocarbon-based electrolytes include polysulfone sulfonic acid, polyaryl ether ketone sulfonic acid, polybenzimidazol alkyl sulfonic acid, polybenzimidazol alkyl phosphonic acid, polystyrene sulfonic acid, polyether ether ketone sulfonic acid, and polyphenyl sulfonic acid.

An important property of a solid proton-conductive material is the proton conductivity. If the equivalent weight (EW) is excessively high, the ion conductivity of the catalyst layer as a whole including proton conduction in the liquid conductive material retaining part that separates between the catalyst component and the solid ion conductive material is decreased. Thus, EW is preferably low. In particular, EW of the solid proton-conductive material is 1200 g/eq. or less and more preferably 700 g/eq. or less.

Note that equivalent weight (EW) means the equivalent weight of ion exchange groups having proton conductivity.

In the electrocatalyst for a polymer electrolyte fuel cell according to the present invention, the liquid conductive material retaining part refers to a space that is formed between the catalyst and the solid proton-conductive material, retains a liquid proton-conductive material, and connects between the catalyst and the solid proton-conductive material in a proton-conductive manner via the liquid proton-conductive material.

The liquid proton-conductive material may be any material that has ion conductivity and an ability to form proton transport paths when retained in the liquid conductive material retaining part provided between the catalyst and the solid proton-conductive material.

Specific examples of the liquid conductive material include protic ion liquids, aqueous perchloric acid solutions, aqueous nitric acid solutions, aqueous formic acid solutions, and aqueous acetic acid solutions.

When water is used as the liquid proton-conductive material, the catalyst layer may be wetted with a small amount of liquid water or humidified gas prior to starting power generation so that water can be introduced to the liquid conductive material retaining part.

Water generated by electrochemical reactions during operation of the fuel cell may also be used. Accordingly, the liquid proton-conductive material need not be retained in the liquid conductive material retaining part of the electrocatalyst at the time operation of the fuel cell is started.

When a material, such as an ionic liquid, other than water is used as the liquid proton-conductive material, the ionic liquid is preferably dispersed in a solution along with the solid proton-conductive material and the catalyst during production of a catalyst ink. Alternatively, the ionic liquid may be added during the process of applying the catalyst to a catalyst layer substrate.

The catalyst may be supported on a conductive carrier composed of a variety of materials as needed. An example of the conductive carrier is a conductive porous carrier. Pores of the conductive porous carrier can be used as the liquid conductive material retaining parts.

In such a case, a porous carrier having pores with a surface pore size smaller than the molecular size of the solid proton-conductive material is selected to effectively prevent contact between the solid proton-conductive material and the catalyst supported in the pores.

Accordingly, if all of the catalyst is supported in the pores and a liquid proton-conductive material such as water is introduced into the pores, proton transport paths can be formed between the catalyst and the solid proton-conductive material while completely blocking the contact between the catalyst and the solid proton-conductive material.

The conductive porous carrier may be any carrier that can form liquid conductive material retaining parts inside or outside the carrier. Examples thereof include carbon materials such as activated carbon and carbon black (Ketjen black, oil furnace black, channel black, lamp black, thermal black, and acetylene black), porous metals such as tin (Sn) and titanium (Ti), and conductive metal oxides.

Among these, Ketjen black is preferably used as the conductive porous carrier since liquid conductive material retaining parts can be easily formed inside the carrier.

In the present invention, it is not essential to use a conductive porous carrier as long as liquid conductive material retaining parts are formed around the catalyst component.

In other words, the conductive carrier may be a nonporous conductive carrier, a nonwoven cloth, a carbon paper, or a carbon cloth composed of carbon fibers constituting a gas diffusion layer, for example. In such cases, a catalyst can be supported on a nonporous conductive carrier or be directly attached to a nonwoven cloth, carbon paper, or a carbon cloth composed of carbon fibers constituting a gas diffusion layer of a membrane electrode assembly.

In the case where water is used as a liquid proton-conductive material of an electrocatalyst for a polymer electrolyte fuel cell of the present invention, the surface distance between the catalyst and the solid proton-conductive material is preferably not less than 0.28 nm, which is the size of oxygen ions constituting water molecules.

When this distance is retained, water (liquid proton-conductive material) can be introduced into the space (liquid conductive material retaining part) between the catalyst and the solid proton-conductive material while maintaining a non-contact state between the catalyst and the solid proton-conductive material. As a result, proton transport paths can be assuredly formed between the catalyst and the solid proton-conductive material through water.

If the proton transport distance in water is extended, the effective ion conductivity is decreased and the power generation performance tends to be degraded. Accordingly, the surface distance between the catalyst and the solid proton-conductive material is preferably less than 30 nm.

In the electrocatalyst for a polymer electrolyte fuel cell according to the present invention, the total area of the catalyst in contact with the solid proton-conductive material is smaller than the total area of the catalyst exposed in the liquid conductive material retaining part.

The areas are compared by, for example, determining the magnitude correlation of capacitance between the electrical double layer formed at the catalyst/solid proton-conductive material interface and the electrical double layer formed at the catalyst/liquid proton-conductive material interface while filling the liquid conductive material retaining part with the liquid proton-conductive material. Since the electrical double layer capacitance is proportional to the area of the electrochemically effective interface, the contact area between the catalyst and the solid proton-conductive material becomes smaller than the area of the catalyst exposed in the liquid conductive material retaining part if the capacitance of the electrical double layer formed at the catalyst/solid proton-conductive material interface is smaller than the capacitance of the electrical double layer formed at the catalyst/liquid proton-conductive material interface.

The method for measuring the capacitances of the electrical double layers at the catalyst/solid proton-conductive material interface and at the catalyst/liquid proton-conductive material interface will now be described. In other words, the magnitude correlation between the contact area between the catalyst and the solid proton-conductive material and the contact area between the catalyst and the liquid proton-conductive material, in other words, the magnitude correlation between the area of the catalyst in contact with the solid proton-conductive material and the area of the catalyst exposed in the liquid conductive material retaining part, is described.

In an electrocatalyst of the system of the present invention, the following four interfaces can contribute to the electrical double layer capacitance (Cdl):

(1) Catalyst/solid proton-conductive material (C-S)
(2) Catalyst/liquid proton-conductive material (C-L)
(3) Conductive porous carrier/solid proton-conductive material (Cr-S)
(4) Conductive porous carrier/liquid proton-conductive material (Cr-L)

As mentioned above, the electrical double layer capacitance is directly proportional to the area of the electrochemically effective interface. Thus, the magnitude correlation between the contact area between the catalyst and the solid proton-conductive material and the contact area between the catalyst and the liquid proton-conductive material can be determined by determining CdlC-S (the electrical double layer capacitance at the catalyst/solid proton-conductive material interface) and CdlC-L (the electrical double layer capacitance at the catalyst/liquid proton-conductive material interface).

The contributions of the four interfaces to the electrical double layer capacitance (Cdl) can be separated as follows.

First, the electrical double layer capacitance is measured under a high-humidity condition such as at 100% RH and under a low-humidity condition such as at 10% RH. Examples of the technique for measuring the electrical double layer capacitance include cyclic voltammetry and electrochemical impedance spectroscopy.

The contribution of the liquid proton-conductive material (water in this case), that is, (2) and (4) above, can be separated by comparing the results.

Deactivating the catalyst separates the contribution of the catalyst to the electrical double layer capacitance. For example, when platinum is used as the catalyst, CO gas is supplied to the electrode at which measurement is taken so as to deactivate the catalyst by adsorbing CO onto the platinum surface. Under such a condition, the electrical double layer capacitance is measured under high-humidity and low-humidity conditions by the method described above and the results are compared to separate the contribution of the catalyst, in other words, (1) and (2) above.

All of the contributions from (1) to (4) can be separated by the above-described procedure and the electrical double layer capacitances at the interfaces between the catalyst and the solid proton-conductive material and between the catalyst and the liquid proton-conductive material can be determined.

In sum, the value (A) observed in a high humidity state is the total electrical double layer capacitance formed at all the interfaces (1) to (4), the value (B) observed in a low humidity state is the electrical double layer capacitance formed at the interfaces (1) and (3). The value (C) observed in a high humidity state with a deactivated catalyst is the electrical double layer capacitance formed at the interfaces (3) and (4). The value (D) observed in a low humidity state with a deactivated catalyst is the electrical double layer capacitance formed at the interface (3).

Thus, the difference between A and C is the electrical double layer capacitance formed at the interfaces (1) and (2) and the difference between B and D is the electrical double layer capacitance formed at the interface (1). The electrical double layer capacitance formed at the interface (2) can be determined by (A−C)−(B−D).

Note that the area of the catalyst in contact with the solid proton-conductive material and the area of the catalyst exposed in the conductive material retaining part can also be determined with a transmission electron microscope (TEM) or by tomography, for example, instead of the above-described method.

A membrane electrode assembly of a polymer electrolyte fuel cell has a structure in which two gas diffusion electrodes respectively constituting an air electrode (cathode) and a fuel electrode (anode) are respectively hot-press bonded to two sides of an electrolyte film composed of a proton-conductive solid polymer material.

Examples of the proton-conductive solid polymer material constituting the polymer electrolyte membrane include fluorine-based electrolytes and hydrocarbon-based electrolytes described above, in particular, perfluorocarbon sulfonic acid-based polymers, polytrifluorostyrene sulfonic acid-based polymers, and perfluorocarbon phosphonic acid-based polymers such as Nafion and Aciplex (fluorine-based electrolytes); and polysulfone sulfonic acid, polyaryl ether ketone sulfonic acid, polybenzimidazol alkyl sulfonic acid, polybenzimidazol alkyl phosphonic acid, and polystyrene sulfonic acid (hydrocarbon-based electrolytes). It is not necessary to use the same solid proton-conductive material as that used in the electrocatalyst.

The gas diffusion layers supply reaction gas to the catalyst layer and collect charges generated in the catalyst layer. A nonwoven cloth, carbon paper, or a carbon cloth composed of carbon fibers is used.

A plurality of such membrane electrode assemblies are stacked while being separated from one another by separators having gas channels so as to constitute a polymer electrolyte fuel cell.

FIG. 1 is a schematic cross-sectional view of an example of such a polymer electrolyte fuel cell.

A fuel cell according to this embodiment includes a membrane electrode assembly, a pair of gas diffusion layers that sandwich the membrane electrode assembly, and separators that sandwich the membrane electrode assembly and the pair of gas diffusion layers and that have ribs that form gas channels in the surfaces facing the gas diffusion layers. The fuel cell shown in the drawing has a structure in which a membrane electrode assembly (MEA) constituted by an electrolyte membrane 10 composed of a proton-conductive solid polymer material and an anode-side gas diffusion electrode 20a and a cathode-side gas diffusion electrode 20c that sandwich the electrolyte membrane 10 is sandwiched between an anode-side separator 30a and a cathode-side separator 30c.

The anode-side gas diffusion electrode 20a is constituted by a catalyst layer 21a that contains the electrocatalyst of the present invention and a gas diffusion layer 22a. The cathode-side gas diffusion electrode 20c is constituted by a catalyst layer 21c that contains the electrocatalyst of the present invention and a gas diffusion layer 22c. The anode-side separator 30a has a gas channel Ca and the cathode-side separator 30c has a gas channel Cc.

The polymer electrolyte fuel cell of the present invention uses the electrocatalyst of the present invention. Preferably, two or more types of solid proton-conductive materials having different EW are contained in the power generating surface and the solid proton-conductive material having the lowest EW among these solid proton-conductive materials is used in the region where the relative humidity of the gas in the channel is 90% or less. When the materials are arranged as such, the resistance values can be decreased irrespective of the current density regions and performance of the cell can be improved.

The solid proton-conductive material used in the region where the relative humidity of the gas in the channel is 90% or less, in other words, the solid proton-conductive material having the lowest EW, preferably has an EW of 900 or less. In this manner, the above-described effects can be more assuredly and notably exhibited.

In the polymer electrolyte fuel cell of the present invention, the proton-conductive material having the lowest EW is preferably used in the region where the temperature is higher than the average temperature at the inlet and outlet of the cooling water. In this manner, the resistance values can be decreased irrespective of the current density regions and performance of the cell can be further improved.

From the viewpoint of decreasing the resistance value of the fuel cell system, the solid proton-conductive material having the lowest EW is preferably used in the region that extends from at least one of a fuel gas supply port and an oxidant gas supplying port to a point within ⅗ of the channel length from that port.

EXAMPLES

The present invention will now be described in specific detail by using examples. It should be understood that the present invention is not limited to these examples.

[1] Preparation of Membrane Electrode Assembly (MEA)

A carbon carrier having pores with surface pore size of about 10 nm was used as a conductive porous carrier. Platinum (Pt) having particle size of 1 to 5 nm was supported on the conductive porous carrier to prepare catalyst powder having a catalyst content of 50%. Ketjen black (particle size: 30 to 60 nm) was used as the carbon carrier.

The catalyst powder and an ionomer dispersion (Nafion (registered trademark) D2020, EW=1100 g/mol, produced by DuPont) serving as a solid proton-conductive material were mixed so that the carbon carrier/ionomer mass ratio was 0.9. Thereto, a propylene glycol solution (50%) was added as a solvent so that the solid content (Pt+carbon carrier+ionomer) was 19%. As a result, a catalyst ink was obtained.

The ink obtained as above was applied to a 5 cm×5 cm region of a polytetrafluoroethylene (PTFE) substrate serving as a hydrophilic porous layer by screen printing so that the amount of Pt supported was about 0.35 mg/cm2. Then a heat treatment was conducted at 130° C. for 30 minutes to remove organic matter serving as a dispersant to form a catalyst layer.

The catalyst layer prepared as above was transferred onto an electrolyte membrane (Nafion (registered trademark) NR211 produced by DuPont) to form a membrane electrode assembly (MEA). The transfer was conducted under conditions of 150° C., 10 min, and 0.8 MPa.

[2] Preparation of Cell

[2-1] Comparative Example

Both sides of the membrane electrode assembly prepared as above were sandwiched with gas diffusion layers (24BC produced by SGL Carbon), carbon separators, and gold-plated current collectors to obtain a cell.

The cell obtained as such was used as a comparative example that does not use the electrocatalyst of the present invention and the electrical double layer capacitances formed at the interfaces between the catalyst and the solid proton-conductive material and between the catalyst and the liquid proton-conductive material were measured. The performance of the cell was also evaluated.

FIG. 3 is a schematic diagram showing a cross-sectional structure of an electrocatalyst in the cell prepared as such.

In the drawing, catalyst (Pt) particles 2 are supported on the outer peripheral surface of a carbon carrier (Ketjen black) 4 and inner surfaces of pores (liquid conductive material retaining parts) 4a. The outer surface of the carbon carrier 4 is covered with Nafion 3 that serves as a solid proton-conductive material.

[2-2] Invention Example

The fuel cell prepared as above was subjected to the following treatment to adjust the contact area between the catalyst and the solid proton-conductive material to be smaller than the contact area between the catalyst and the liquid proton-conductive material to thereby prepare a polymer electrolyte fuel cell that uses an electrocatalyst of the present invention.

In the cell prepared as above, humidity-controlled nitrogen gas heated to 80° C. was distributed in a working electrode and humidity-controlled hydrogen gas was distributed in a counter electrode. The humidity of the gas was adjusted to 10% RH at which the electrical double layer capacitance is sufficiently low determined based on the humidity dependency of the electrical double layer capacitance preliminarily measured. As a result, only the catalyst/solid proton-conductive material interface and the carbon carrier/solid proton-conductive material interface became electrochemically effective.

In this state, the potential of the working electrode was varied (0.6-1.0 V (vs. RHE)) to melt the catalyst particles 2 in contact with the solid proton-conductive material 3 and being supported on the outer peripheral portion of the carbon carrier 4.

This potential varying (holding each potential for 3 seconds) was conducted 150000 cycles. As a result, a polymer electrolyte fuel cell that included an electrocatalyst 1 (see FIG. 2) of the present invention in which the amount of the catalyst particles 2 in contact with the solid proton-conductive material 3 at the outer peripheral portion of the carrier 4 was reduced by melting was obtained. The electrical double layer capacitance of the catalyst surface was measured and the performance of the cell was evaluated by the same methods.

[3] Measurement of Electrical Double Layer Capacitance

The cells of Example and Comparative Example obtained as above were subjected to electrochemical impedance spectroscopy to determine the electrical double layer capacitances in a high humidity state, in a low humidity state, in a high humidity state with a deactivated catalyst, and in a low humidity with a deactivated catalyst. The contact areas between the catalyst and the respective proton-conductive materials in the electrocatalysts of the two cells were compared.

The instruments used were electrochemical measurement system HZ-3000 produced by Hokuto Denko Corporation and frequency response analyzer FRA5020 produced by NF Corporation. The measurement conditions shown in Table 1 were employed.

TABLE 1

| | |
|---|---|
| Cell temperature | 30° C. |
| Frequency range | 20 kHz to 10 mHz |
| Amplitude | ±10 mV |
| Holding potential | 0.45 V |
| Supplied gas (counter electrode/working electrode) | $H_2/N_2$ |
| Humidity (counter electrode/working electrode) | 5/5% RH to 100/100 RH |

First, each cell was heated to 30° C. with a heater and the electrical double layer capacitance was measured while supplying nitrogen gas and hydrogen gas having humidity adjusted as shown in Table 1 were respectively supplied to the working electrode and the counter electrode.

In measuring the electrical double layer capacitance, as shown in Table 1, 0.45 V was held and the potential of the working electrode was varied in a frequency range of 20 kHz to 10 mHz at an amplitude of ±10 mV.

In particular, the real part and the imaginary part of the impedance at each frequency are obtained from the response during oscillation of the working electrode potential. Since the relationship between the imaginary part (Z") and the angular velocity ω (converted from the frequency) is expressed by the following formula, the reciprocal of the imaginary part is organized for negative square of the angular velocity and the value when the negative square of the angular velocity is zero is extrapolated to determine the electrical double layer capacitance Cdl.

$$C_{dl} = \frac{1}{\omega Z''} - \frac{1}{\omega^2 R_{ct}^2 C_{dl}}$$

This measurement was sequentially conducted in low humidity states and in high humidity states (5% RH→10% RH→90% RH→100% RH).

Nitrogen gas containing 1% (volume ratio) CO was distributed in the working electrode at 1 NL/min for 15 minutes or longer to deactivate the Pt catalyst and then the electrical double layer capacitance in the high humidity and low humidity states was measured in the same manner. The results are shown in Table 2. The electrical double layer capacitance observed was converted to a value per area of the catalyst layer.

The electrical double layer capacitance formed at the catalyst/solid proton-conductive material (C-S) interface and the electrical double layer capacitance formed at the catalyst/liquid proton-conductive material (C-L) interface were calculated based on the measured values. The results are shown in Table 3.

In the calculation, the values observed under a 5% RH condition and under a 100% RH condition were used as representation of the electrical double layer capacitances in a low humidity state and a high humidity state.

TABLE 2

| | | Electrical double layer capacitance (mF/cm²) | | | |
|---|---|---|---|---|---|
| Classification | Catalyst | 5% RH | 10% RH | 90% RH | 100% RH |
| Comparative Example | Active | 11.77 | 12.61 | 31.96 | 32.33 |
| | Deactivated | 5.56 | 6.17 | 20.04 | 20.20 |
| Invention Example | Active | 10.67 | 10.89 | 28.52 | 28.85 |
| | Deactivated | 5.97 | 6.07 | 17.36 | 17.51 |

TABLE 3

| | Electrical double layer capacitance (mF/cm²) | | | Current density ($\mu A/cm^2_{Pt}$) |
|---|---|---|---|---|
| Classification | C-S interface C-L interface | C-S interface | C-L interface | |
| Comparative Example | 12.13 | 6.21 | 5.92 | 286 |
| Invention Example | 11.34 | 4.70 | 6.64 | 322 |

[4] Evaluation of Cell Performance

The fuel cell was held at 80° C. Oxygen gas having a humidity adjusted to 100% RH was distributed in the oxygen electrode and hydrogen gas having a humidity adjusted to 100% RH was distributed in the fuel electrode (as a result, water is introduced into pores (liquid conductive material retaining parts 4a) of the carbon carrier (Ketjen black) 4 and this water serves as a liquid proton-conductive material). The electron load was set so that the current density was 1.0 A/cm2 and retained for 15 minutes.

The current density was decreased stepwise until the cell voltage was 0.9 V or more. The relationship between the current density and the potential was acquired while retaining each current density for 15 minutes. Then the current density per catalyst surface area was determined by conversion using the catalyst effective surface area acquired under a 100% RH condition and the current densities at 0.9 V were compared. The results are shown in Table 3.

The results in Table 3 clearly show that a cell of Comparative Example that used an electrocatalyst in which the capacitance of the electrical double layer formed at the interface between the catalyst and the solid proton-conductive material was larger than the capacitance formed at the interface between the catalyst and the liquid proton-conductive material exhibited a current density of 286 µA/cm2 per platinum surface area.

In contrast, a cell that used an electrocatalyst of the present invention in which the electrical double layer capacitance formed at the interface between the catalyst and the solid proton-conductive material was smaller exhibited a high current density of 322 µA/cm2.

The catalyst effective surface area was measured with electrochemical measurement system HZ-3000 described above. The potential of the sample to be measured was swept under conditions shown in Table 4 and the catalyst effective surface area was calculated from the amount of electricity generated by adsorption of protons to the catalyst platinum.

TABLE 4

| | |
|---|---|
| Cell temperature | 80° C. |
| Scanning potential range | 0.02 V to 0.9 V |
| Scanning speed | 50 mV/s |
| Number of cycles | 3 cycles |
| Supplied gas (counter electrode/working electrode) | $H_2/N_2$ |
| Humidity (counter electrode/working electrode) | 100/100 RH |

[Implementing Test 2]

Example 1

Black pearl (specific surface area: 1500 m2/g) was used as a carbon carrier that served as a conductive porous carrier. Cobalt alloy particles 1 to 5 nm in size serving as a catalyst were supported on the carbon carrier so that the weight ratio of the cobalt alloy was 50% so as to prepare catalyst powder.

The catalyst powder and ionomer dispersions serving as solid proton-conductive materials having different proton-conductive group weight equivalents (EW), namely, Nafion (registered trademark) D2020 (EW=1100 g/mol produced by DuPont) and perfluorosulfonic acid ionomer IN201 (EW=660 g/mol produced by Asahi Glass Co., Ltd.) were used to prepare two types of catalyst inks with different ionomers. In each catalyst ink, the mass ratio of the ionomer to the conductive porous carrier in the catalyst powder was adjusted to 0.9.

The inks prepared as above were applied to a 5 cm×5 cm region of a polytetrafluoroethylene (PTFE) substrate serving as a hydrophilic porous layer by a spray coating method so that the ratio of the area in which the former catalyst ink (EW=1100 g/mol) was applied to the area in which the latter catalyst ink (EW=660 g/mol) was applied was 4:6 and that the amount of Pt supported was about 0.35 mg/cm2. Then a heat treatment at 130° C. was carried out for 30 minutes to remove organic matter serving as a dispersant so as to form a catalyst layer.

The catalyst layer prepared as above was transferred onto an electrolyte membrane (Nafion (registered trademark) NR211 produced by DuPont) to prepare a membrane electrode assembly (MEA).

Example 2

A MEA was prepared by repeating the same process as in Example 1 except that only Nafion (registered trademark) D2020 was used as the ionomer dispersion serving as a solid proton-conductive material.

Comparative Example 1

A MEA was prepared by repeating the same process as in Example 1 except that graphitized Ketjen black (specific surface area: 150 m2/g) which was a carbon carrier was used as the conductive porous carrier.

Comparative Example 2

A MEA was prepared by repeating the same process as in Comparative Example 1 except that only Nafion (registered trademark) D2020 was used as an ionomer dispersion as a solid proton-conductive material.

Example 3

A MEA was prepared by repeating the same process as in Example 1 except that only perfluorosulfonic acid ionomer IN201 (EW=660 g/mol produced by Asahi Glass Co., Ltd.) was used as the solid proton-conductive material.

The two surfaces of the membrane electrode assembly prepared as above were sandwiched between gas diffusion layers (25BC produced by SGL Carbon), carbon separators, and gold-plated current collectors to prepare a cell.

The cells prepared as such were analyzed as in Implementing Test 1 so as to measure the electrical double layer capacitances formed at the interface between the catalyst and the solid proton-conductive material and at the interface between the catalyst and the liquid proton-conductive material, to calculate the coverage ratio of the catalyst covered with the solid proton-conductive material and to evaluate the performance of the cells. The coverage ratio is calculated by determining the ratio of the electrical double layer capacitance measured in a low humidity state to the electrical double layer capacitance measured in a high humidity state. Values observed at 5% RH and 100% RH were used as the representative examples of the humidity states.

[Evaluation of Cell Performance]

The fuel cell was held at 80° C. Oxygen gas with a controlled humidity was distributed into the oxygen electrode and hydrogen gas with a controlled humidity was distributed into the fuel electrode while relative humidity of 100% to 40% was used as the representative humidity conditions. Then the current density value per catalyst surface area at which the voltage was 0.9 V and the voltage value at which the current density was 1.0 A/cm2 were determined. The results are shown in Tables 5 and 6.

TABLE 5

| Classification | EW of solid proton-conductive material (g/mol) | Coverage ratio | Relative humidity (%) | Current density per contact surface area at 0.9 V | Voltage at 1.0 A/cm$^2$ (V) |
|---|---|---|---|---|---|
| Example 1 | 660 + 1100 | 0.35 | 40 | 231 | 0.61 |
| Example 2 | 1100 | 0.35 | 40 | 179 | 0.58 |
| Comparative Example 1 | 1100 + 1100 | 0.74 | 40 | 165 | 0.32 |
| Comparative | 660 | 0.74 | 40 | 172 | 0.30 |

TABLE 5-continued

| Classification | EW of solid proton-conductive material (g/mol) | Coverage ratio | Relative humidity (%) | Current density per contact surface area A/cm² at 0.9 V | Voltage at 1.0 A/cm² (V) |
| --- | --- | --- | --- | --- | --- |
| Example 2 | | | | | |

TABLE 6

| Classification | EW of solid proton-conductive material (g/mol) | Relative humidity (%) | Coverage ratio | Voltage at 1.0 A/cm² (V) |
| --- | --- | --- | --- | --- |
| Example 2 | 1100 | 40 | 0.35 | 0.59 |
| Example 3 | 660 | | 0.35 | 0.62 |
| Example 2 | 1100 | 70 | 0.35 | 0.66 |
| Example 3 | 660 | | 0.35 | 0.67 |
| Example 2 | 1100 | 90 | 0.35 | 0.67 |
| Example 3 | 660 | | 0.35 | 0.70 |
| Example 2 | 1100 | 100 | 0.35 | 0.70 |
| Example 3 | 660 | | 0.35 | 0.62 |

The results in Tables 5 and 6 clearly show that the power generation performance was improved when an electrocatalyst in which the electrical double layer capacitance at the catalyst/solid proton-conductive material interface is smaller than that at the catalyst/liquid proton-conductive material interface, in other words, an electrocatalyst having a low coverage ratio, was used in a catalyst layer coated with a solid proton-conductive material having a small proton-conductive group weight equivalent and a MEA including this catalyst layer is disposed in a region of a fuel gas channel at which the relative humidity was 90% or less.

The catalyst effective surface area was measured by using electrochemical measurement system HZ-3000 mentioned above while sweeping the potential of the sample to be measured under the condition indicated in Table 4 and calculating the catalyst effective surface area on the basis of the amount of power generated by proton adsorption to the catalyst metal.

The invention claimed is:

1. A polymer electrolyte fuel cell comprising an electrolyte membrane between an anode and a cathode, each comprising electrocatalyst,
   a pair of gas diffusion layers; and
   separators each having gas channels in a surface that faces a respective gas diffusion layer, the electrocatalyst comprising particles, each particle comprising:
   a conductive catalyst support particle comprising:
      liquid conductive material retaining parts formed of pores having a surface pore opening through an exterior surface of the conductive catalyst support particle and having a depth within the catalyst support particle;
      a liquid proton-conductive material held within the liquid conductive material retaining parts; and
      solid proton-conductive material coating a majority of an exterior of the conductive support particle along with the surface pore openings of the liquid conductive material retaining parts; and
   active catalyst particles supported entirely within the liquid conductive material retaining parts of each conductive catalyst support particle, the active catalyst particles being a metal that is directly supported by the conductive catalyst support particle;
   wherein the liquid proton-conductive material conductively connects the active catalyst particles to the solid proton-conductive material in a proton-conductive manner and is disposed between the active catalyst particles in the liquid conductive material retaining parts and the solid proton-conductive material,
   a physical contact area between the active catalyst particles and the solid proton-conductive material is smaller than an area of the active catalyst particles exposed in the liquid conductive material retaining part, and
   wherein the electrocatalyst comprises particles with a first type of solid proton-conductive material and particles with a second type of solid proton-conductive material, the first type of solid proton-conductive material having a lower equivalent weight than that of the second solid proton-conductive material, and the only particles of the electrocatalyst used in a region of the anode or the cathode where a relative humidity of gas in the gas channels is 90% or less are particles with the first type of solid proton-conductive material.

2. The polymer electrolyte fuel cell according to claim 1, wherein the liquid conductive material retaining part is filled with the liquid proton-conductive material, and an electrical double layer capacitance formed at a catalyst/solid proton-conductive material interface is smaller than an electrical double layer capacitance formed at a catalyst/liquid proton-conductive material interface.

3. The polymer electrolyte fuel cell according to claim 1, wherein the active catalyst particles in the liquid conductive material retaining parts is not in physical contact with the solid proton-conductive material.

4. The polymer electrolyte fuel cell according to claim 1, wherein the conductive support particle is carbon black.

5. The polymer electrolyte fuel cell according to claim 1, wherein an equivalent weight of the solid proton-conductive material is 1200 g/eq. or less.

6. The polymer electrolyte fuel cell according to claim 1, wherein the metal of the active catalyst particles is at least one metal selected from the group consisting of Pt, Ir, Co, Ni, Fe, Cu, Ru, Ag, and Pd.

7. The polymer electrolyte fuel cell according to claim 1, wherein the solid proton-conductive material having the lowest equivalent weight has an equivalent weight of 900 g/eq. or less.

8. The polymer electrolyte fuel cell according to claim 1, wherein the solid proton-conductive material having the lowest equivalent weight is used in a region of the anode or the cathode where a temperature is higher than an average temperature at an inlet and an outlet of cooling water.

9. The polymer electrolyte fuel cell according to claim 1, wherein the solid proton-conductive material having the lowest equivalent weight is used in a region of the cathode or anode that extends from at least one of a fuel gas supply port and an oxidant gas supplying port to a point within ⅗ of a channel length from a respective port.

* * * * *